United States Patent Office 3,738,838
Patented June 12, 1973

3,738,838
SUBLAYER FOR PHOTOGRAPHIC POLYESTER FILM BASE
Yuzo Ando and Motoo Kogure, Tokyo, Japan, assignors to Konishiroku Photo Industry Co., Ltd.
No Drawing. Filed Sept. 10, 1968, Ser. No. 758,696
Claims priority, application Japan, Sept. 19, 1967, 42/59,603
Int. Cl. G03c 1/78
U.S. Cl. 96—87    2 Claims

ABSTRACT OF THE DISCLOSURE

A sublayer for a photographic polyester film base, which comprises a homopolymer of a monomer of the general formula

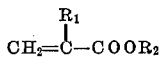

in which $R_1$ stands for hydrogen, methyl or chlorine, and $R_2$ for a chlorinated alkyl, or methyl or ethyl, when $R_1$ is chlorine, or a copolymer of the monomer with other polymerizable ethylenically unsaturated compound.

---

This invention relates to a sublayer for a photographic polyester film base, which comprises a homopolymer of a monomer of the general formula

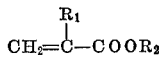

in which $R_1$ stands for hydrogen, methyl or chlorine and $R_2$ for a chlorinated alkyl, or methyl, or ethyl, when $R_1$ is chlorine, or a copolymer of the monomer with other polymerizable ethylenically unsaturated compound.

There have been proposed a number of subbings for a photographic polyester film base. However, these conventional subbings have such demerits that when subbing is effected, transparency of the film becomes poor or adhesion is weak. The object of this invention is to provide an excellent sublayer which is free from these demerits.

The monomers of the general formula utilizable in this invention can be prepared according to the processes described in J Obschei Chimie 28, 1930, ibid. 21, 1841, J. Am. Chem. Soc. 64, 2390, ibid. 62, 3495, Ind. Eng. Chem. 28, 1160, etc. and the polymers used in this invention can be prepared from the monomers mentioned below but the monomers utilizable in this invention are not limited to the mentioned: chloromethyl methacrylate, chloromethyl acrylate, 2-chloroethyl methacrylate, 2-chloroethyl acrylate, 1-chloroethyl methacrylate, 1-chloroethyl acrylate, 1,2-dichloroethyl methacrylate, 1,2-dichloroethyl acrylate, 1,2,2-trichloroethyl methacrylate, 2,2-dichloroethyl methacrylate, 1,2,2,2-tetrachloroethyl methacrylate, 1,2,2,2-tetrachloroethyl acrylate, methyl α-chloroacrylate, ethyl α-chloroacrylate, chloromethyl α-chloroacrylate, 2-chloroethyl α-chloroacrylate, 1,2,2-trichloroethyl α-chloroacrylate, 2,2-dichloroethyl α-chloroacrylate, 1,2,2,2-tetrachloroethyl α-chloroacrylate, etc.

As the above-mentioned polymerizable ethylenically unsaturated compounds, the following compounds come into question: acrylic acid, methacrylic acid, α-chloroacrylic acid, itaconic acid, methyl acrylate, ethyl acrylate, propyl acrylate, butyl acrylate, methyl methacrylate, ethyl methacrylate, ethyl methacrylate, propyl methacrylate, butyl methacrylate, phenyl acrylate, phenyl methacrylate, cyclohexyl methacrylate, 2-hydroxyethyl methacrylate, vinyl acetate, vinyl chloroacetate, vinyl benzoate, vinyl chloride, vinylidene chloride, styrene, chlorine-substituted styrene, acrylonitrile, acrylamide. etc. The monomers used in this invention are not limited to these.

Shown below are examples for syntheses of homopolymers of the monomers represented by the general formula and copolymers of the monomers with other polymerizable ethylenically unsaturated compounds.

(1) Synthesis of polychloromethyl methacrylate.—Into 100 ml. of dioxane are dissolved 10 g. of chloromethyl methacrylate and 0.032 g. of azo-bis-isobutyronitrile is added to the solution. The mixture is subjected at 80° C. for 16 hours to polymerization reaction in nitrogen atmosphere. The reaction mixture is added to a large amount of petroleum ether to form a precipitate which is collected by filtration and dried to obtain 9.8 g. of poly(chloromethyl)methacrylate.

(2) Emulsion polymerization of β-chloroethyl methacrylate.—To 150 cc. of water containing 0.2 g. of ammonium persulfate, 0.2 g. of sodium metasulfite and 5 g. of sodium laurylsulfate are added dropwise at 60° C. under agitation 50 g. of 2-chloroethyl methacrylate and the reaction is continued for 10 hours to obtain an emulsion polymerization liquid. With a view to stabilizing the liquid, 0.2 g. of sodium salt of sulfonated phenol-formaldehyde resin as stabilizer is added thereto and then nitrogen gas is blown into the liquid to eliminate the unreacted monomer whereupon an emulsion polymerization liquid containing 28% of solid matter is obtained.

(3) Copolymer of methyl α-chloroacrylate/itaconic acid.—Into 240 cc. of acetone are dissolved 19.3 g. of methyl α-chloroacrylate and 5.2 g. of itaconic acid. In nitrogen atmosphere, 0.08 g. of azo-bis-isobutyronitrile is added and the mixture is subjected at 60° C. for 48 hours to polymerization reaction under weak pressure of nitrogen. The reaction mixture is cooled and added to a large amount of ether to precipitate a polymer which is collected by filtration and dried to obtain 20 g. of a copolymer containing 78 mol percent methyl α-chloroacrylate and 22 mol percent itaconic acid.

(4) Copolymer of chloromethyl methacrylate/methyl methacrylate/methacrylic acid.—Into 900 cc. of dioxane are dissolved 94.2 g. of chloromethyl methacrylate, 20 g. of methyl methacrylate and 8.6 g. of methacrylic acid. To this solution is added 0.1 g. of benzoyl peroxide and the mixture is subjected at 80° C. for 28 hours to polymerization. After polymerization, a polymer is precipitated by addition of the reaction mixture to a large amount of ligroin and then dried whereupon 90 g. of a copolymer containing 70 mol perecent chloromethyl methacrylate, 18 mol percent methyl methacrylate and 12 mol percent methacrylic acid is obtained.

According to this invention, a homopolymer of a monomer of the general formula or a copolymer thereof with other polymerizable ethylenically unsaturated compounds is dissolved into an organic solvent and the solution is applied onto a polyester film base or alternatively, an emulsion polymerization liquid of such polymer is applied onto the film. In case the polymer is dissolved into an organic solvent, the organic solvent may be one ordinarily used, for example, a halogenated hydrocarbon such as methylene chloride, ethylene dichloride, chloroform, trichloroethylene or tetrachloroethylene; an alcohol such as methanol, ethanol or isopropanol; a ketone such as acetone, methyl ethyl ketone, chloroacetone or cyclohexanone; a phenol such as phenol, cresol or chlorophenol; an organic acid such as formic acid, acetic acid, monochloroacetic acid or trichloroacetic acid; a cyclic ether such as tetrahydrofuran or dioxane; or an ether or ester such as methyl Cellosolve, methyl Cellosolve acetate, ethyl acetate or ethyl lactate. In general, a mixture of these solvents is preferable.

If necessary, a solution of a hydrophilic high molecular substance may be applied in this invention onto the sublayer of said polymer.

As the hydrophilic high molecular substance, a natural high molecular substance such as gelatin or casein, a synthetic high molecular substance such as polyvinyl alcohol or a derivative thereof, a hydrophilic high molecular substance containing therein at least 20 mol percent carboxylic acid groups such as a copolymer of maleic acid and methyl vinyl ether, vinyl acetate, methyl methacrylate or styrene or a copolymer of methacrylic acid, acrylic acid, itaconic acid, or α-chloroacrylic acid and vinyl acetate, methyl methacrylate, styrene or a monomer of the general formula can be used.

On application of the sublayer, a preliminary treatment of a polyester film base with an aqueous solution of alkali or oxidizer such as caustic soda or potassium permanganate serves to improve adhesiveness.

This invention is applicable for all of the layers of photographic light-sensitive elements such as a silver halide emulsion layer, anti-halation layer and antistatic layer. The sublayer of a homopolymer of a monomer of the general formula or of copolymers thereof with other polymerizable ethylenically unsaturated compounds, which layer may be overcoated with a hydrophilic high molecular substance, binds a photographic emulsion layer or the like strongly without damaging transparency of the polyester film base and without producing injurious influence on the silver halide emulsion.

The following examples illustrate this invention but it is to be understood that this invention is not limited thereto.

EXAMPLE 1

A subbing solution which contains 1.5% polychloromethyl methacrylate dissolved into a mixture of ethylene chloride and phenol in the ratio of 9:1 is applied onto a polyester film base and dried. Onto the sublayer layer is further applied a mixture of organic solvents (88.5 parts of methanol, 10 parts of o-cresol and 1.5 parts of glacial acetic acid) containing 1% gelatin. After drying, a silver halide emulsion is applied onto the gelatin layer and dried. A test for evaluating binding effect is carried out as follows: A cellophane tape is sticked onto the silver halide emulsion layer of the resulting light-sensitive element and then peeled off rapidly. In this case, if adhesion of the emulsion layer is weak, it will be peeled off the base and adheres to the tape. In this example, however, the emulsion layer does not peel off the base.

EXAMPLE 2

A subbing solution which contains 1.5% copolymer of methyl α-chloroacrylate/itaconic acid dissolved into a mixture of phenol and acetane in the ratio of 1:9 is applied onto a polyester film and dried. A silver halide emulsion is applied onto the sublayer and dried. When the degree of adhesion of the resulting silver halide light-sensitive element is tested in a manner similar to that described in Example 1, the emulsion layer does not peel off the base, passing the test.

EXAMPLE 3

A subbing solution which contains 2% copolymer of chloromethyl methacrylate/methyl methacrylate/methacrylic acid dissolved into a mixture of ethylene dichloride and o-chlorophenol in the ratio of 8:2 is applied onto a polyester film and dried. Onto the sublayer is further applied a mixture of organic solvents (89 parts of methanol, 10 parts of phenol and 1 part of glacial acetic acid) containing 1.5% gelatin. Then, a silver halide emulsion is applied onto the gelatin layer and dried. This film passed the adhesion test described in Example 1.

EXAMPLE 4

A subbing solution containing 1.3% copolymer of 1,2,2,2-tetrachloroethyl methacrylate/acrylic acid dissolved into dioxane is applied onto a polyester film, the surface of which has previously been treated with a 20% aqueous solution of caustic soda and washed with water, and dried. A mixture of organic solvents (80 parts of ethylene chloride, 19 parts of methanol and 1 part of glacial acetic acid) containing 1% gelatin is then applied onto the sublayer and dried. A silver halide emulsion is further applied onto the gelatin layer and dried. The resulting film passed the adhesion test described in Example 1.

EXAMPLE 5

An emulsion polymerization liquid of 2-chloroethyl methacrylate is applied onto a polyester film, which has been treated at 60° C. for 2 minutes with a mixture of 2.5% aqueous potassium permanganate and 5% aqueous caustic soda and washed with water, and dried. Onto the sublayer is further applied a solution containing 1% copolymer of methacrylic acid/vinyl acetate/maleic anhydride (6:2:2) dissolved into a mixture of 9.5 parts of acetone and 0.5 part of ethyl lactate. A silver halide emulsion is then applied onto the said copolymer layer. This film passed the adhesion test described in Example 1.

EXAMPLE 6

A subbing solution which contains 1.5% copolymer of methyl α-chloroacrylate/itaconic acid dissolved into a mixture of 1 part of phenol and 9 parts of acetone is applied onto a polyester film and dried. A 1% aqueous solution of gelatin to which small amounts of a hardening agent and saponin are added is applied onto the sublayer and then a silver halide emulsion abounding extremely in the hardening agent is applied onto the gelatin layer and dried. This film passed the adhesion test described in Example 1.

EXAMPLE 7

A copolymer of chloromethyl methacrylate/methyl methacrylate/methacrylic acid is applied in a manner similar to that of Example 3 onto a polyester film and a solution containing 2% copolymer of chloromethyl methacrylate/itaconic acid (75:25) dissolved into a mixture of 9 parts of acetone and 1 part of phenol is applied onto the sublayer. A silver halide emulsion is then applied and dried. This film passed the adhesion test described in Example 1.

What we claim is:

1. A photographic element comprising a polyester film base layer; a sublayer containing a homopolymer of a monomer of the general formula:

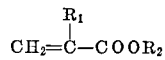

in which $R_1$ is hydrogen, methyl or chlorine, and $R_2$ is chlorinated alkyl; or methyl, or ethyl when $R_1$ is chlorine, or a copolymer of said monomer with another ethylenically unsaturated compound; and a light-sensitive silver halide emulsion layer.

2. The element as claimed in claim 1 further including a layer of a hydrophilic high molecular substance on said sublayer and between the sublayer and the emulsion layer.

References Cited

UNITED STATES PATENTS

| | | | |
|---|---|---|---|
| 3,353,958 | 11/1967 | Moede | 96—87 |
| 3,228,770 | 1/1966 | Nadeau et al. | 96—87 |
| 3,214,274 | 10/1965 | Ohyama et al. | 96—87 |
| 3,201,250 | 8/1965 | Coryell et al. | 96—87 |
| 3,370,951 | 2/1968 | Hasenauer et al. | 96—87 |
| 3,447,947 | 6/1969 | Abbott et al. | 117—76 F |
| 3,586,508 | 6/1971 | Fowler et al. | 96—87 |
| 3,589,905 | 6/1971 | Reedy et al. | 96—87 |

FOREIGN PATENTS

| | | |
|---|---|---|
| 982,938 | 2/1965 | Great Britain. |
| 770,067 | 1967 | Canada. |

NORMAN G. TORCHIN, Primary Examiner

R. L. SCHILLING, Assistant Examiner